A. H. PELTIER.
VEHICLE.
APPLICATION FILED DEC. 19, 1919.

1,357,895.

Patented Nov. 2, 1920.
2 SHEETS—SHEET 1.

WITNESSES

INVENTOR
A.H.Peltier,
BY
ATTORNEYS

A. H. PELTIER.
VEHICLE.
APPLICATION FILED DEC. 19, 1919.

1,357,895.

Patented Nov. 2, 1920.
2 SHEETS—SHEET 2.

WITNESSES

INVENTOR
A.H.Peltier,
BY
ATTORNEYS

UNITED STATES PATENT OFFICE.

ARTHUR HENRY PELTIER, OF BRISTOL, TENNESSEE.

VEHICLE.

1,357,895.   Specification of Letters Patent.   Patented Nov. 2, 1920.

Application filed December 19, 1919. Serial No. 345,933.

*To all whom it may concern:*

Be it known that I, ARTHUR HENRY PELTIER, a citizen of the United States, and a resident of Bristol, in the county of Sullivan and State of Tennessee, have invented certain new and useful Improvements in Vehicles, of which the following is a specification.

My invention is an improvement in vehicles, and has for its object to provide a toy vehicle of the three wheel type, having laterally spaced driving wheels at one end and the steering wheel at the other, and a body to which the wheels are connected, and having a seat which may be easily and quickly moved vertically and horizontally with respect to the body to permit children of different ages and physical development to ride the vehicle comfortably.

Figure 1:
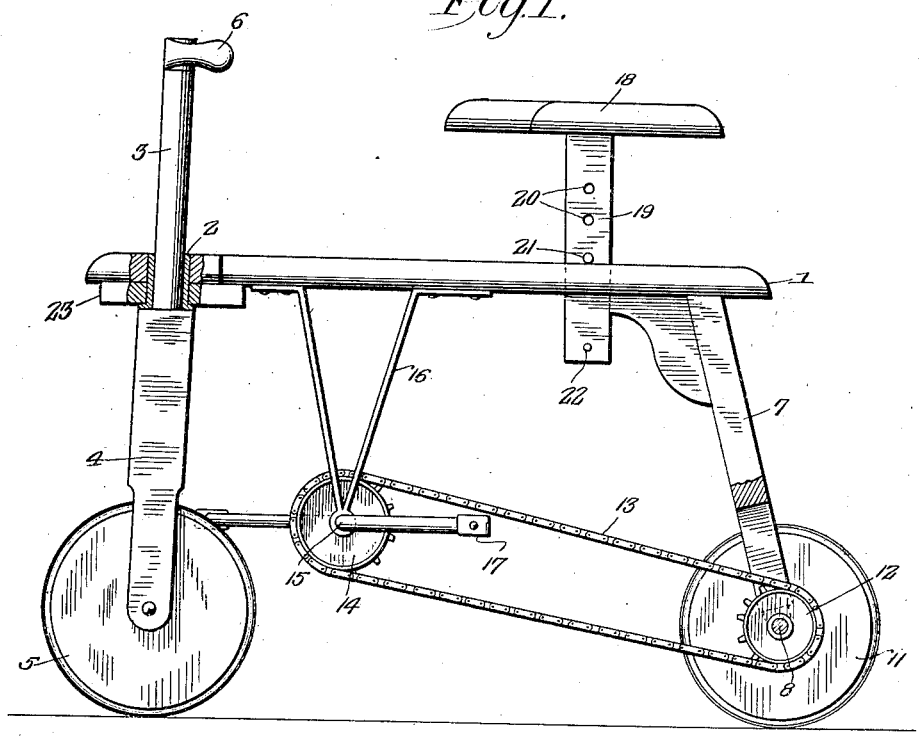
Figure 1 is a side view of the improved vehicle, with parts in section.
Figure 2:
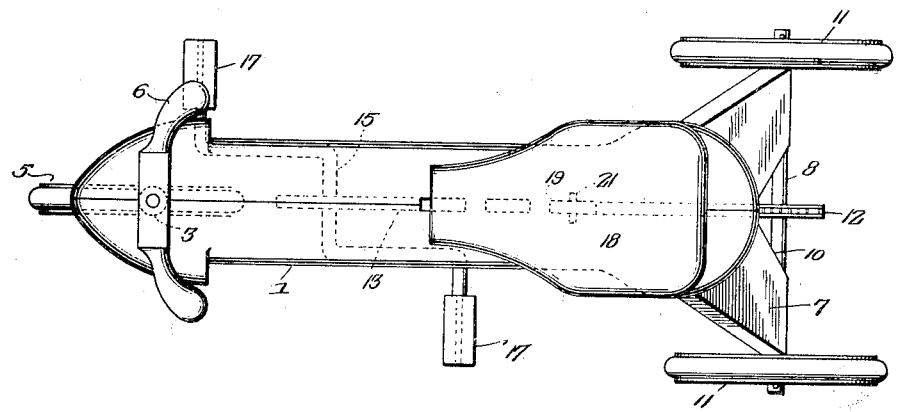
Fig. 2 is a top plan view.
Figure 3:
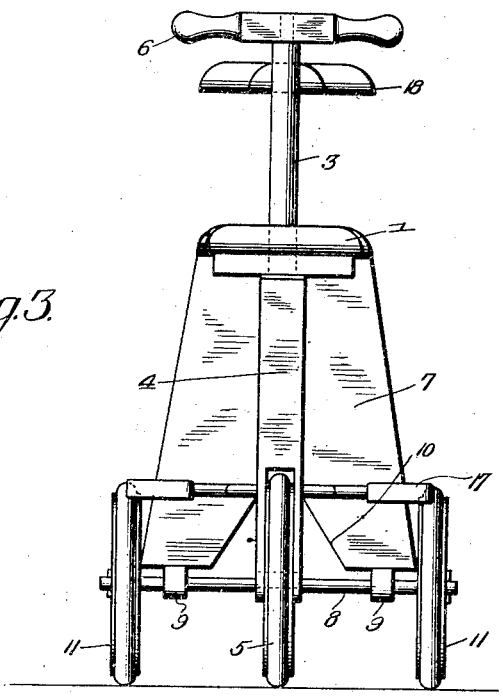
Fig. 3 is a front view.
Figure 4:
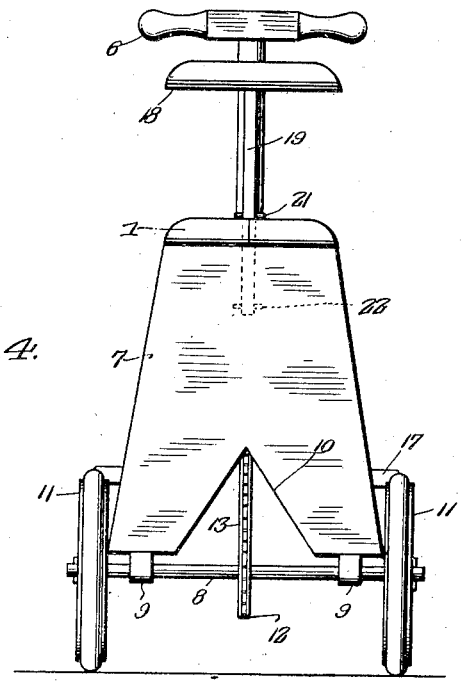
Fig. 4 is a rear view.

In the present embodiment of the invention the improved vehicle comprises a top beam made of similar mating side sections 1 in the form of a plate having at the front end thereof a metal bushing 2, in which is journaled a steering head 3, the said shaft carrying a fork 4 at its lower end, between whose arms the front wheel 5 is held, the said wheel being journaled between the arms; the steering shaft has a handle bar 6 at its upper end, forming a handle by means of which the wheel 5 may be swung to steer the vehicle and by which the operator retains position on the device. As will be seen in Fig. 2, the top beam 1 consists of two similar sections, the mating faces or edges of which are provided with the half notches or recesses which are complementary, and the forward ones of which constitute the seat of the bushing 2, while the rear series constitutes adjusting sockets for the seat post 19 of the saddle 18.

A great advantage of making the top beam in sections, as just pointed out lies in the fact that the quantity production is increased, and the parts can be packed and shipped in great quantities to finally be assembled.

The side sections are of course rigidly connected together, as well as the blocks 23, which are used at the front to afford an increased bearing and support for the bushing 2.

At the rear of the top beam a bolster 7 extends downwardly and outwardly and rearwardly, and a rear axle 8 is journaled at the lower end of the bolster, transversely of the body 1, the axle being held in bearings 9 depending from the spaced apart lower ends of the bolster, and it will be noticed that the lower end of the bolster is notched as shown at 10, at its center, for a purpose to be presently set forth.

Wheels 11 are secured to the ends of the axle, and a sprocket wheel 12 is secured to the axle intermediate the ends thereof and at the notch 10 before mentioned and provided for that purpose. A sprocket chain 13 conects this wheel 12 with a wheel 14 on a crank shaft 15 which is journaled in bearings at the lower end of Y-shaped brackets 16 depending from the body 1, between the steering shaft and the bolster 7. This crank shaft has pedals 17 at its ends for engagement by the feet of the user, and it will be obvious that when the crank shaft is turned the rear axle will be driven, and the vehicle will be propelled.

A seat or saddle 18 is adjustably connected with the body, the seat having a depending saddle post 19 noncircular in cross section and mounted in a slot in the body 1, said slot being formed by the half slots, or complementary recesses in the two sections and the post has a vertical series of openings 20 for receiving a cross pin 21, such pin to rest on the beam and hold the seat in adjusted position. A cross pin 22 is also provided at the lower end of the arm to limit the upward movement of the arm, to a point such that it cannot be entirely withdrawn from the slot or passage, without removing said cross pin 22. By using the series of slots or openings through the top beams, the device can be adapted for children of various sizes and conditions.

By engaging the pin 21 with different openings of the series 20 it will be obvious that the seat 18 may be elevated more or less above the body 1 of the vehicle, to provide for children having different lengths of legs. The bushing 2 has a marginal flange at its lower end which fits between a reinforcing plate 23 on the under face of the body and the body of the fork 4. The fork limits the downward movement of the bushing and the bushing limits the upward movement of the fork.

In use, the seat is adjusted to the length of the child's legs who will ride the vehicle. The provision of the two wheels at the rear and the one at the front provides for easy steering and eliminates the danger of upsetting through loss of balance.

I claim:

In combination, a vehicle as herein characterized comprising a top beam including mating side sections having complementary notches in their abutting edges, one pair of notches disposed at the front of the beam, and a metal bushing having its lower end flanged and supported therein, others of such pairs disposed in a horizontal series extending toward the rear of the beam, a front fork carrying a single guide wheel at its lower end and having a steering head rotatably mounted in said bushing, a bolster projecting downwardly and rearwardly from said top beam said bolster diverging downwardly, axle bearings depending from the lower ends of said bolster, a rear axle carrying driving wheels at its ends and hung in said bearings, a saddle post adjustably mounted in one of the rear series of openings in the top beam, said saddle post carrying a saddle at its upper end and provided with a vertical series of transverse openings therethrough to receive a cross pin adapted to rest on the top beam in the vertical adjustment of the saddle post, said saddle post provided with lateral stop means adjacent its lower end to prevent the saddle post from being entirely removed from the top beam.

ARTHUR HENRY PELTIER.